United States Patent
Burry et al.

(10) Patent No.: US 6,239,786 B1
(45) Date of Patent: May 29, 2001

(54) POINTING STICK WITH TOP MOUNTED Z-AXIS SENSOR

(75) Inventors: Stephen W. Burry; Nelson T. Clark, both of Berne; Ronald J. Dedert, Geneva, all of IN (US); Mark Grube, Rockford, OH (US); Timothy L. Hartigan, Bluffton, IN (US); David L. Poole, Portland, IN (US); Dennis Raesner, Berne, IN (US); Lewis L. Seffernick, Decatur, IN (US); Ronald Stuckey, Monroe, IN (US); Eric B. Taylor, Decatur, IN (US); Robert M. VandenBoom, Markle, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/201,207

(22) Filed: Nov. 30, 1998

(51) Int. Cl.[7] .................................................... G09G 5/08
(52) U.S. Cl. .................... 345/161; 345/160; 345/168; 345/156; 341/22; 341/23
(58) Field of Search ........................... 345/161, 156, 345/160, 168; 341/22, 23

(56) References Cited

U.S. PATENT DOCUMENTS

| | | | |
|---|---|---|---|
| 4,680,577 | 7/1987 | Straayer et al. | 345/161 |
| 4,905,523 | 3/1990 | Okada | 345/73 |
| 5,407,285 * | 4/1995 | Franz | 341/22 |
| 5,489,900 | 2/1996 | Cali et al. | 345/161 |
| 5,504,502 * | 4/1996 | Arita et al. | 345/156 |
| 5,521,596 | 5/1996 | Selker et al. | 345/161 |
| 5,659,334 * | 8/1997 | Yaniger et al. | 345/156 |
| 5,805,140 * | 9/1998 | Rosenberg et al. | 345/161 |
| 5,889,507 * | 3/1999 | Engle et al. | 345/161 |
| 5,986,645 * | 11/1999 | Brooks | 345/161 |
| 6,030,291 * | 2/2000 | Maki et al. | 345/161 |

\* cited by examiner

Primary Examiner—Richard Hjerpe
Assistant Examiner—Ali Zamani
(74) Attorney, Agent, or Firm—Mark P. Bourgeois; Mark W. Borgman

(57) ABSTRACT

A pointing stick for controlling the positioning, movement and operation of a cursor on the display screen. Specifically, there is a pointing stick that both directs a cursor and acts as the activation button for selecting items on the display screen by tapping on the pointing stick instead of clicking on a mouse button. Uniquely, the device is made of a shaft (12) having a longitudinal length oriented along a first axis (39) and having a top surface that is perpendicular to the first axis, there is a vertical force sensor (59, or 71), mounted on the top surface of the shaft, for sensing a vertical oriented force applied to the shaft along the first axis. Cap (24), has a cavity (81) with a top surface (79) therein, where the top surface of the shaft is positioned within the cavity and spaced from and juxtaposed to the top surface of the cavity. In one embodiment the vertical sensor includes first and second electrically conductive pads that are electrically isolated from each other. The vertical sensor also has a flexible conductive layer positioned next to the top surface of the cavity of the cap. Additionally, the vertical sensor has an electrically insulative spacer (78) shaped to position the first and second pads away from the flexible conductive layer. In a second embodiment, the vertical sensor comprises a pressure sensitive layer (60) located on the top surface of the shaft. Additionally, the alternative vertical sensor has a strain concentrator, shaped and positioned to concentrate a z-axis oriented force applied to the cap to effect the electrical conductivity of the pressure sensitive layer.

7 Claims, 5 Drawing Sheets

POINTING STICK WITH TOP MOUNTED Z-AXIS SENSOR

CO-PENDING PATENT APPLICATIONS

This application is related to the following:

1) co-pending U.S. application Ser. No. 08/717517, entitled, COLLAR MOUNTED POINTING STICK, filed Sep. 23, 1996;
2) co-pending U.S. application Ser. No. 08/756,202, entitled, Z-AXIS SENSING POINTING STICK WITH BASE AS STRAIN CONCENTRATOR, filed Nov. 25, 1996;
3) co-pending U.S. application Ser. No. 08/794,703, entitled, Z-AXIS POINTING STICK WITH E.S.D. PROTECTION, filed Feb. 4, 1997; and
4) co-pending U.S. application Ser. No. 08/082,700, entitled, A POINTING STICK HAVING AN INTERPOSER CONNECTING LAYER, filed May 21, 1998.

The aforementioned are assigned to the assignee named in the present application and are herein incorporated by reference in their entirety for related and necessary information.

BACKGROUND OF THE PREFERRED EMBODIMENT(S)

1. Field of the Preferred Embodiment

This invention generally relates to a pointing device for controlling the positioning, movement and operation of a cursor on a display screen. Specifically, there is a pointing stick that both directs a cursor and acts as the activation button for selecting items on the display screen by tapping the top of the pointing stick instead of clicking on a mouse button.

2. Description of the Related Art

Various devices are well known for controlling cursor movement over a display screen of a computer and for signaling a choice of computer commands identified by the position of the cursor on the display screen menu. One such device is a "mouse" which has a ball on its underside rolled over a horizontal surface, with the x- and y-axis components of movement being sensed and transmitted through a connecting cable to a serial input port of the computer. The signal to the computer is varied by the amount and direction of movement of the mouse ball, and causes the cursor on the display screen to have a corresponding movement. One or two "mouse" or "click" buttons located on the top of the mouse at the forward end permit the computer operator to enter a selection or other command to the computer. A typical command being shown by the position of the cursor on a displayed menu, which upon pressing the buttons will operate features of the software program associated with the device. Such a device, which is separate from the computer console and keyboard also requires a connection to a computer port. Additionally, this device always requires a flat, horizontal surface. More importantly, for proper operation of the mouse, the computer operator must completely remove one hand from the computer keyboard.

Another cursor controlling and signaling mechanism is a "joystick" which like the mouse is completely separated from the computer console and keyboard. The joystick is typically an elongated stick that extends upwardly from a base connected to the computer console by means of a cable. The joystick is operated by tilting the upstanding stick in various directions to cause the cursor or other display element to move in a direction and usually at a speed corresponding to the direction and pressure exerted on the stick by the computer operator. The operation of a joystick, however, frequently requires that both hands be removed from the computer keyboard, one hand to hold the base while the other manipulates the joystick. A "click" button is usually located on the joystick. Although a mouse or a joystick can be used with a portable "laptop" or "notebook" size computers, such devices are cumbersome, must be carried separately and connected to the computer before use, and are not suitable for operation during travel.

Still, another type of cursor controlling device is a "trackball." This device, which in essence is an inverted mouse, includes a rotatable ball mounted within a housing. The ball is rotated by a finger, thumb or palm of the computer operator, and the x- and y-components of movement are sensed and input into the computer to cause corresponding movement of the cursor across the display screen. "Mouse" or "click" buttons are usually located on the trackball housing, although with some models the selection signal is input by pressing the "enter" key on the standard keyboard. This type of pointing device has been found useful with portable computers because it can be temporarily affixed to one side of the computer case for manipulation by one hand of the computer operator. However, although trackball devices can be removably attached to the computer case, they still require attachment before use and removal after use. It is also noted that some trackballs are built into the computer keyboard. Nonetheless, these trackballs require a separate set of "click" buttons for selection of items on the display monitor.

Manufacturers of portable laptop computers, recognizing the need for placing the cursor controlling device in a permanent and more convenient location, installed a small stubby, button-like joystick centrally around the keys of the computer keyboard, specifically at the juncture of the "g," "h" and "b" keys of the standard "QWERTY" keyboard. The joystick, also known as a pointing stick, was sensitive to lateral pressure, the amount and direction of which were sensed and input into the computer to cause movement of the cursor, and the speed and direction of cursor movement corresponded to the amount and direction of pressure on the joystick. However, the manufacturer has to provide upwardly extending "mouse" or "click" buttons somewhere on the computer.

Despite the advantages of each type of cursor control, none have allowed the user to both control the cursor movement and select items on the display using exclusively a pointing stick device. Additionally, no prior art allows the user this dual control by using only one finger while allowing the remaining fingers to reside on the home row of the standard keyboard.

DESCRIPTION OF RELATED ART

Examples of patents related to the present invention are as follows, wherein each patent is herein incorporated by reference for related and supporting teachings:

U.S. Pat. No. 5,521,596, is a sensor device placed either underneath a key cap or a key on a keyboard or between two keys on a keyboard so that cursor movement may be carried out from the keyboard itself.

U.S. Pat. No. 5,489,900, is a force sensitive transducer for use in a computer keyboard.

U.S. Pat. No. 4,905,523, is a force detector and moment detector using resistance elements.

U.S. Pat. No. 4,680,577, is a multipurpose key switch for controlling cursor movement on a CRT display and for character entry includes a key cap that moves laterally to provide cursor control and that moves vertically for character entry.

The foregoing patents reflect the state of the art of which the applicant is aware and are tendered with the view toward discharging applicants' acknowledged duty of candor in disclosing information that may be pertinent in the examination of this application. It is respectfully stipulated, however, that none of these patents teach or render obvious, singly or when considered in combination, applicants' claimed invention.

SUMMARY OF THE PREFERRED EMBODIMENTS

It is a feature of the invention to provide a pointing stick for controlling the positioning, movement and operation of a cursor on the display screen. Specifically, there is a pointing stick that both direct a cursor and acts as the activation button for selecting items on the display screen by tapping on the pointing stick instead of clicking on a mouse button.

A further feature of the invention into provide a device for controlling movement of an object that is electrically responsive to the device. Uniquely, the device is made of a shaft (12) having a longitudinal length oriented along a first axis (39) and having a top surface that is perpendicular to the first axis. The device also has a base (14) having a top surface with the shaft fixedly mounted therein. Additionally, the device has a horizontal force sensor (30), positioned on the device, for sensing a horizontal force applied to the shaft and is oriented perpendicular to the first axis. There is also a vertical force sensor (59, or 71), mounted on the top surface of the shaft, for sensing a vertical oriented force applied to the shaft along the first axis.

Yet a further feature of the invention includes a cap (24), having a cavity (81) with a top surface (79) therein, where the top surface of the shaft is positioned within the cavity and spaced from and juxtaposed to the top surface of the cavity.

Additionally, the invention further has the vertical sensor including a first and second electrically conductive pad that are electrically isolated from each other. This vertical sensor has a flexible conductive layer positioned next to the top surface of the cavity of the cap. Additionally, the vertical sensor may have an electrically insulative spacer (78) shaped to position the first and second pads away from the flexible conductive layer. Whereby a sufficient z-axis oriented force applied to the cap will cause the flexible layer to deform and contact both the first and second pad to make electrical contact therebetween, which is indicative of a "mouse click."

Alternatively, the vertical sensor comprises a pressure sensitive layer (60) located on the top surface of the shaft. Additionally, the alternative vertical sensor has a strain concentrator, shaped and positioned to concentrate a z-axis oriented force applied to the cap to affect the electrical conductivity of the pressure sensitive layer. The strain concentrator is attached to the cap and may be in a shape of a rounded cone having the cone apex positioned on the pressure sensitive layer.

Another feature of the preferred embodiment has the horizontal sensor means including a pressure sensitive strip (32), located on at least two sides of the shaft, which extends above the top surface of the base and into the base.

Additional features of the preferred embodiment include an input trace positioned on the shaft and coupled to the vertical sensor, for coupling the vertical sensor to a voltage source; and an output trace positioned on the shaft and coupling to the vertical sensor, for outputting signals indicative of a sufficient force being applied in the z-axis direction. There is also a flexible cable for supplying and receiving a voltage from the vertical and horizontal sensors and being mounted on the base; and a bonding material located between opposing surfaces of the shaft and the base for securely bonding the shaft to the base.

There has thus been outlined, rather broadly, the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

BRIEF DESCRIPTION OF THE DRAWINGS

These and other features of the invention can best be understood by the following description of the accompanying drawings as follows.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENT

Figure 1:
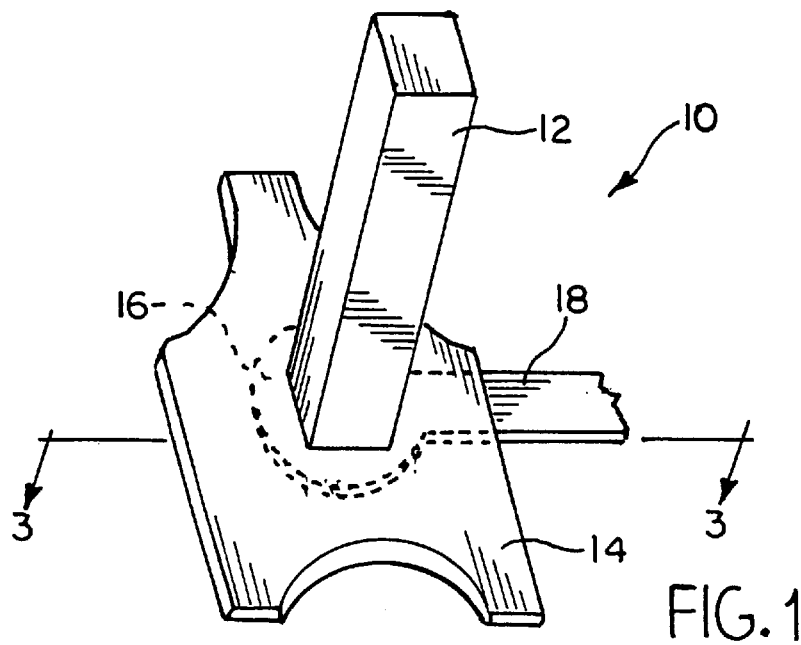
FIG. 1 is a perspective view of a broad view of a preferred embodiment of the pointing stick.
Figure 2:
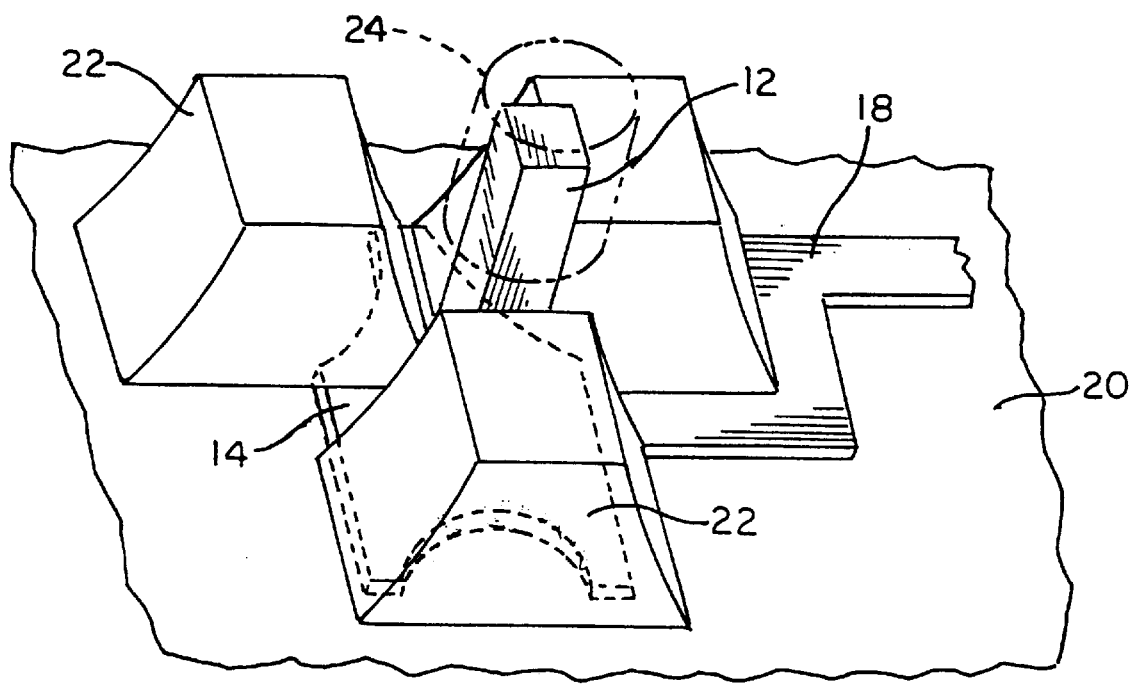
FIG. 2 is a perspective view of the pointing stick in FIG. 1 as positioned between keys of a keyboard.

Referring to both FIGS. 1 and 2, there is a pointing stick 10 that can be used to control the movement of a curser on a computer screen (not shown). In particular, the pointing stick 10 is made up of a stick 12 (or shaft), a substrate 14 for supporting the stick 12, and a cavity 16 formed in the base 14 for placement of a flexible cable 18 that is electrically connected to strain gages (not shown) located on stick 12. The stick may be made of alumina ceramic material or other rigid materials, like some plastics. Typically, the cable 18 may be made of polyamide material containing electrical traces thereon. Pointing stick 10 is typically positioned on supporting base 20 and between the B, G and H keys 22 of a typing keyboard. Typically, the pointing stick has a rubber-like cap 24 positioned over the top of stick 12 to increase the ease of operation. The cap is designed to enable the operator to control the cursor with a single finger positioned on top of it and pushing in the desired cursor direction. The finger pressure causes strain in the stick that is sensed by the sensitive strain gages (not shown). Base 14, may be made of epoxy glass, FR4, or molded polycarbonate material, to name a few, will have some impact upon the strain gages because of the increased flexibility of base 14 around the gages.

Figure 3:
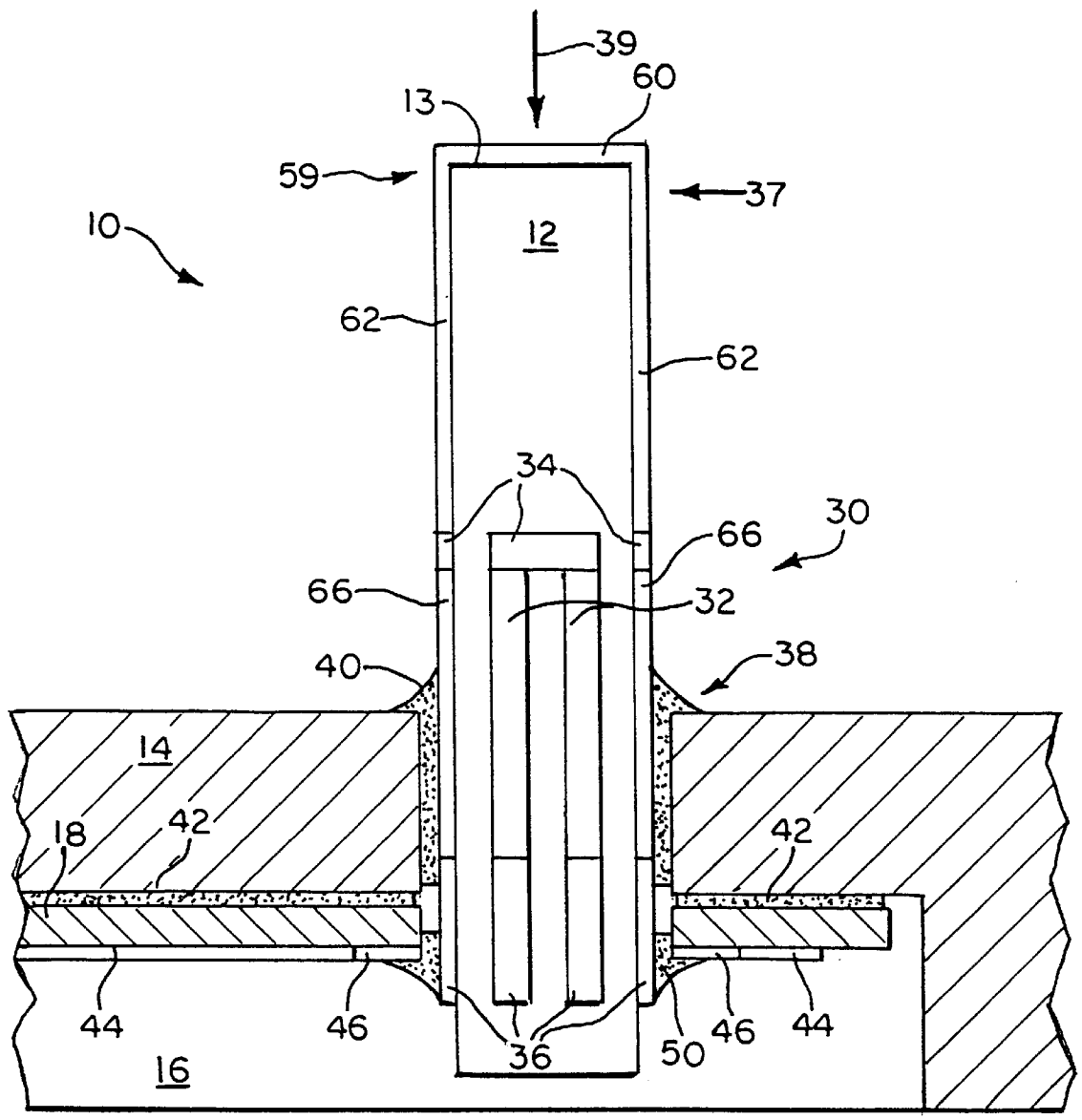
FIG. 3 is a detailed cross-sectional view of FIG. 1

Referring to FIG. 3, there is a cross-sectional view of FIG. 1 taken along the edge of cable 18 and along the one side of the stick 12. In particular, the following additional elements are illustrated: Strain gages 30, 32 are mounted on the sides of the stick 12 and in one embodiment are made of 1) pressure sensitive strips 32 and 66, for electrically changing the resistance of the material in response to the amount of strain applied thereto, 2) a conductive contact bridge 34 for electrically connecting the two strips 32, and 3) conductive contact pads 36 for making electrical contact to electronic circuitry (not shown) via flexible cable 18. Stick 12 extends through hole 38 in a z-axis direction 39, and may be held in place by an adhesive bond epoxy 40. For example, a cyanoacrylate adhesive material is also suitable. In this embodiment, flexible cable 18 is positioned within cavity 16 and adhesively bonded to the cavity wall via adhesive 42. Cable 18 has electrical traces 44 and input/output (I/O) pads 46 mounted thereon. Contact pads 36 are bonded to I/O pads 46 by any suitable bond material 50, like tin-lead solder. There is a longitudinal vertical axis 39 that is perpendicular to horizontal axis 37.

A portion of a vertical force sensor 59 is located on the top surface 13 of shaft 12. Specifically, the sensor includes a piezoelectric material, piezoresistive material or strain gage 60, which is positioned on the top surface 13 of shaft 12. Additionally, there are input and output traces 62 that are electrically coupled to strain gage 60 and flexible film 18.

Pointing stick 10 can be assembled as follows: The first step usually involves either the screening of resistive thick film or the sputtering of resistive thin film material onto stick 12. The screened on material forms the strain gages 30 and 60. The second step often involves the placement of the stick 12 onto the substrate or base 14. After that, usually flexible cable 18 is attached to connect contact pads 36 to I/O pads 46. At this stage, a certain amount of bonding material 40 and 50 is applied onto appropriate surfaces to secure both mechanical and electrical connection accordingly. Finally, the whole assembly is cured to harden the bonding materials.

In operation, one skilled in the art will understand that as shaft 12 has a force applied along force line 37, for example, the resistance of strain gages 32 will change and by that generate a different voltage output that can be used to sense the applied direction of force 37. That direction information is used, for example, to move a curser on a computer screen in the direction of applied force 37.

Figure 4:
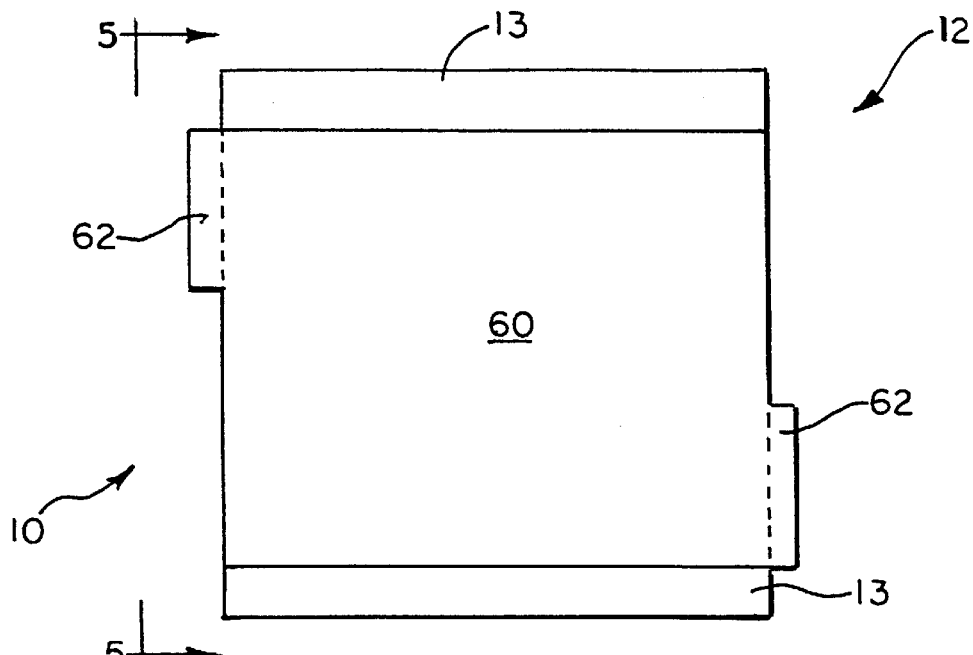
FIG. 4 is a top view of the shaft with one embodiment of the z-axis design.

In additional reference to FIG. 4, there is a top view of one preferred embodiment for sensing z-axis forces applied along line 39. In particular, there is a strain gage 60 (also called a pressure sensitive layer) placed over a substantial portion of the top surface 13 of shaft 12. There is an input and output electrical trace 62 that is in electrical contact with the strain gage 60.

Figure 5:
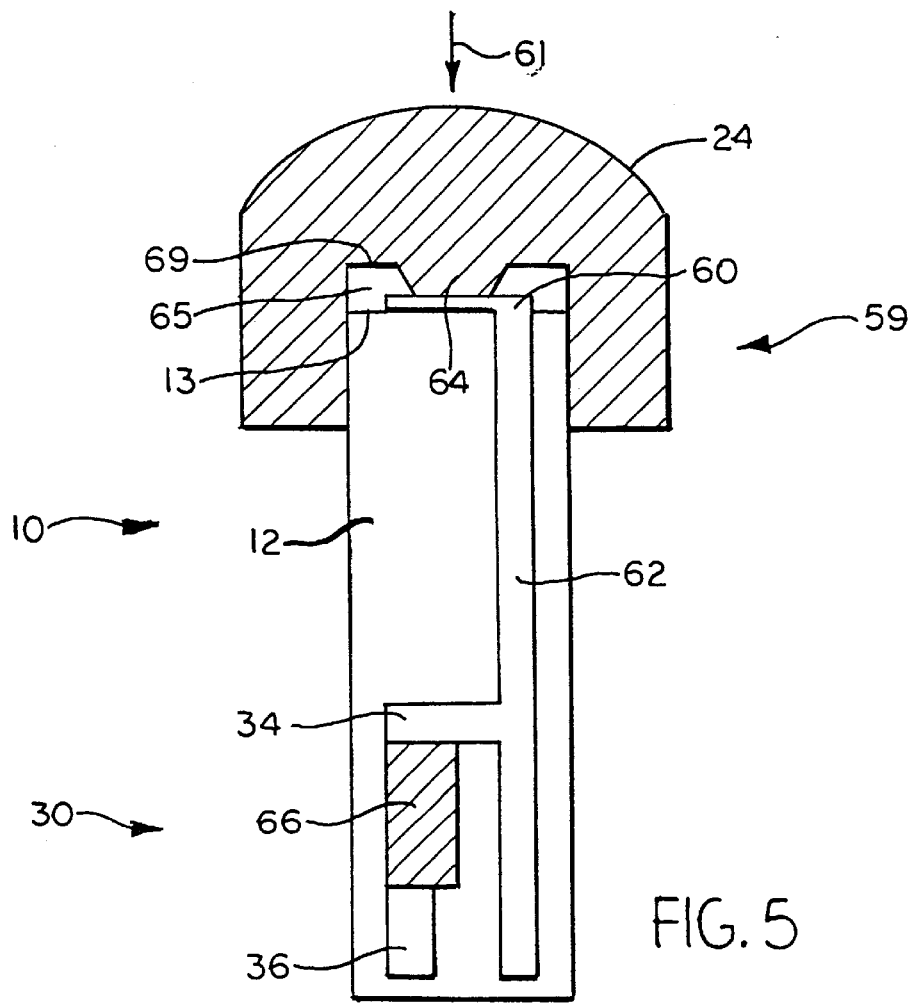
FIG. 5, is a cross sectional side view of the preferred embodiment showing additional features associated to FIG. 4.

Referring additionally to FIG. 5, there is a sectional side view of the vertical z-axis sensor means 59. Specifically, vertical force sensor 59 has a strain concentrator 64 that may be part of cap 24. The strain concentrator may form a cavity 65 between the top surface 13 of shaft 12 and a top surface 69 of cavity 65 in cap 24, depending upon the shape and size of the strain concentrator. A preferred embodiment for the side mounted strain gage 30 includes conductor sections 34 and 36, enlarged strain gage section 66, and signal trace conductor line 62. One skilled in the art will realize that sections 34, 36, 62 and 66 must overlap for proper operation. Of course, strain gage 66 must be positioned in the same vertical orientation as strain gage 32 as illustrated in FIG. 3.

In operation, as a sufficient z-axis oriented force 61 is applied to cap 24, concentrator 64 will direct pressure onto strain gage 60. The resistance of strain gage 60 will change appropriately and by that change the voltage output also changes. The change in voltage is sensed by an appropriate circuitry to indicate a desire to initiate a function similar to that of clicking a button on a mouse for selecting an object on a computer screen, for example.

Figure 6:
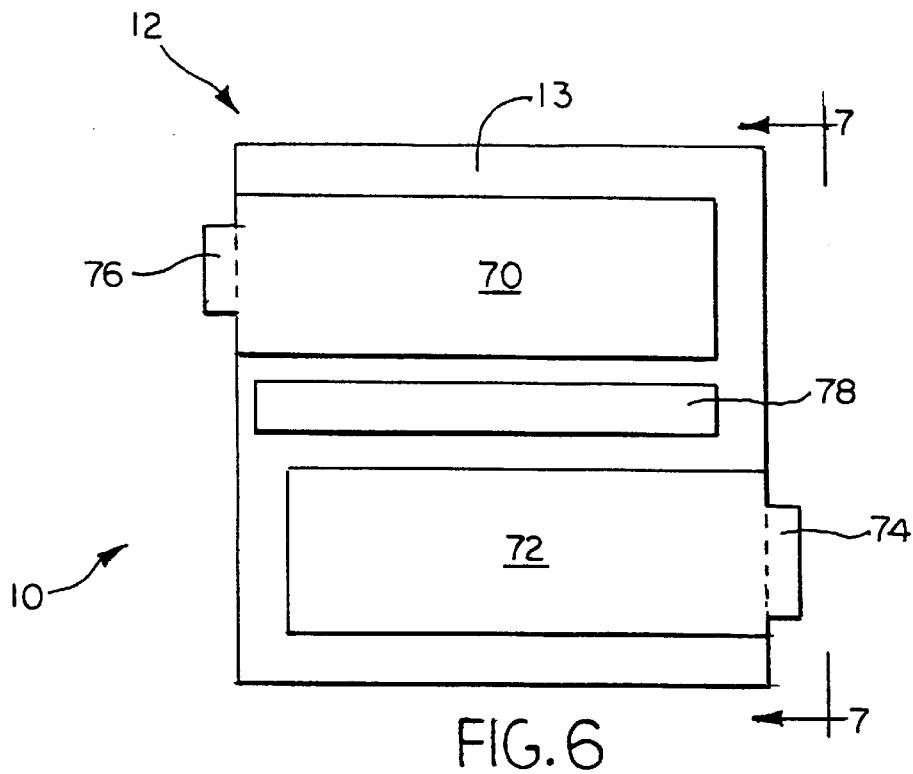
FIG. 6, is a top view of the shaft with a second embodiment of the z-axis design.

Concerning FIG. 6, there is a top view of a second alternative embodiment for sensing z-axis forces oriented along force line 61. Uniquely, shaft 12 has a first conductive portion or pad 70 and a second conductive portion or pad 72 that may be separated by a spacer 78. Conductive traces 74 and 76 are electrically coupled to the respective pads 70 and 72.

Figure 7:
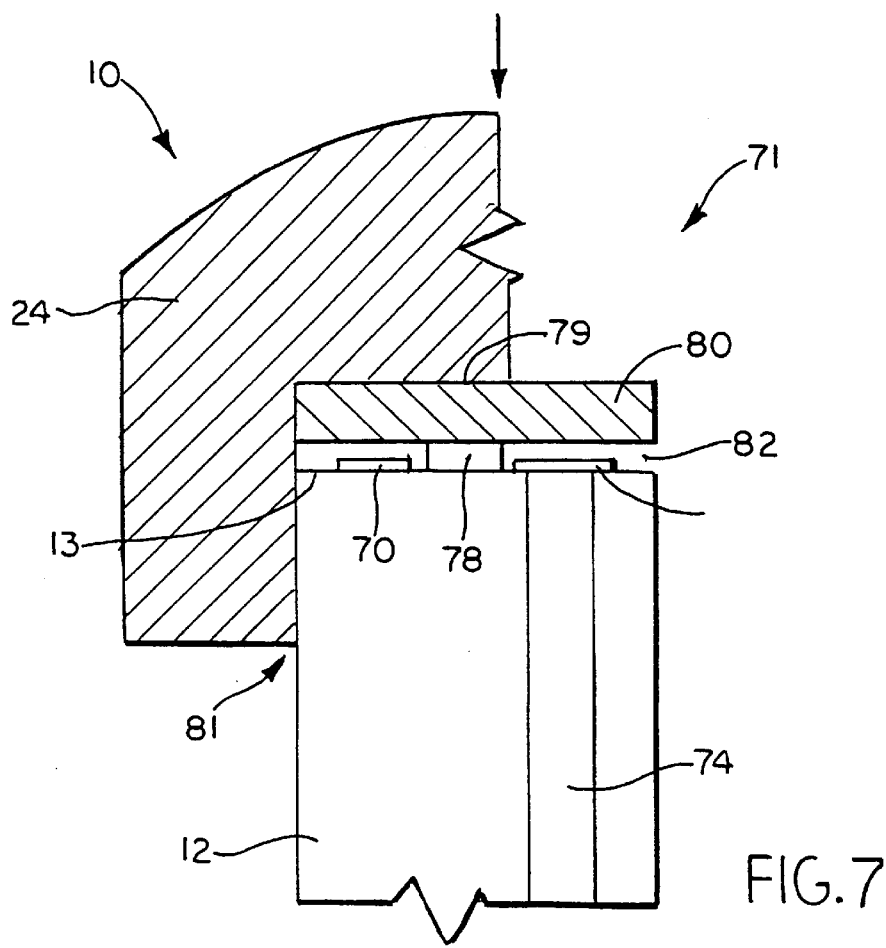
FIG. 7, is a cross sectional side view of the preferred embodiment showing additional features associated to FIG. 6.

Referring to FIG. 7, there is a sectional side view of the vertical z-axis sensor means 71 related to the features of FIG. 6. Specifically, there is a cap 24 mounted over the end of shaft 12. A deformable and elastic conductive material forms conductive layer 80 located in top surface 79 of cap cavity 81. Spacer 78 forms a spacer cavity 82 to prevent conductive material 80 form contacting conductive pads 70 and 72 (not shown) until a sufficient z-axis directed force 61 is applied. The sufficient z-axis force will cause conductive layer 80 to deform on either side of spacer 78, if present, to make electrical connection between pads 70 and 72. The remainder of the pointing stick is similarly designed as illustrated in previous figures. The two conductor pads 70 and 72 are not visible since they are so thin, but are located on shaft surface 13 and electrically coupled to trace 76 and 74 respectively.

Figure 8:
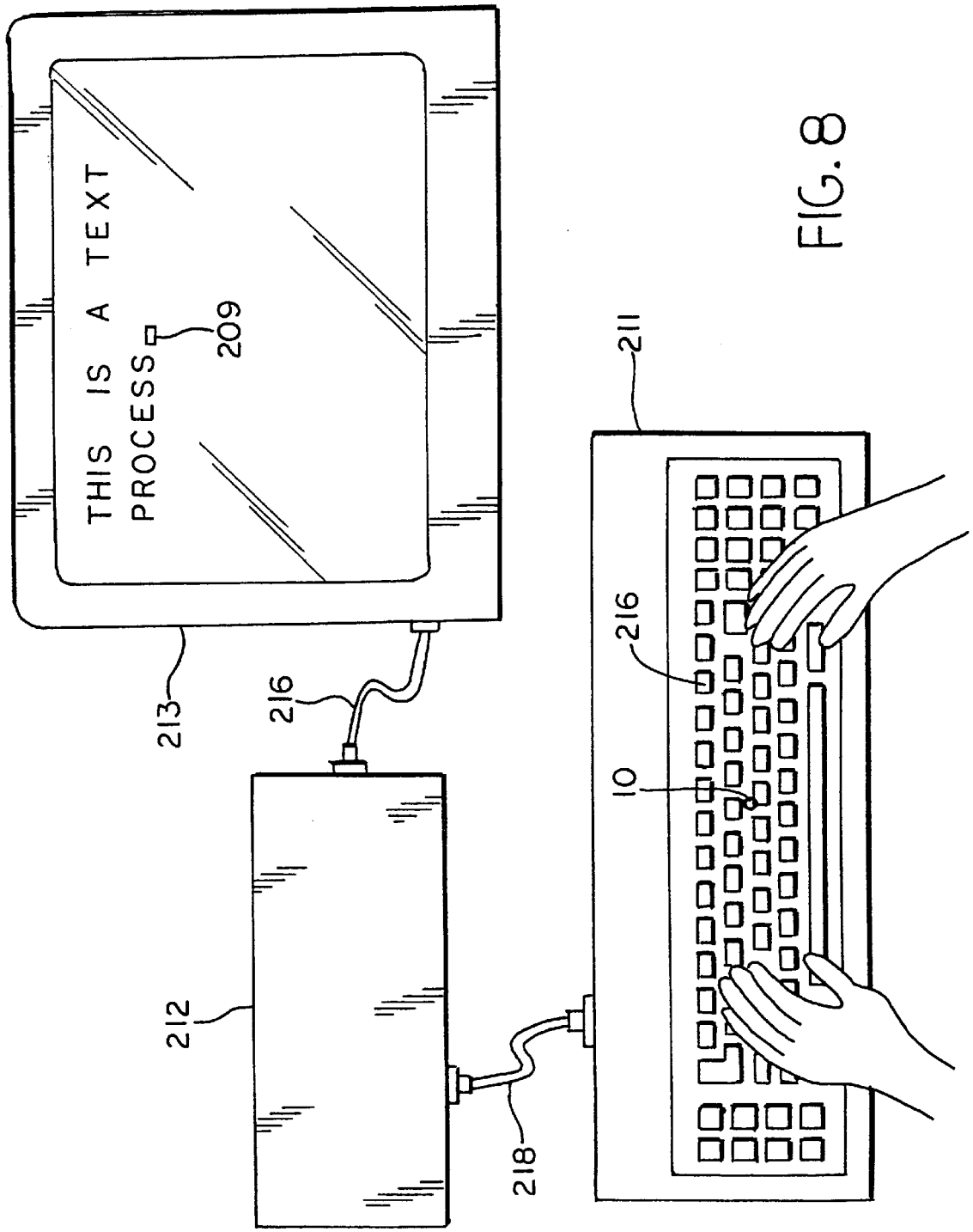
FIG. 8, is an illustration of the pointing stick as used on a keyboard operated computer system.

Referring to FIG. 8, there is shown a keyboard operated computer system. The system includes a keyboard 211 implemented by this invention and connected to a computer 212. The data entry from keyboard 211 is displayed on a computer display or monitor 213 during the normal course of operation of an application program. The keyboard has a layout of keys 216 that is an industry standard. The keyboard is shown to have an output cable 218 coupled to the computer 212. The computer is coupled to the monitor via connecting cable 206. A cursor 209 is displayed on the computer monitor 213. Pointing stick 10 is located in the middle of the keyboard 211.

Remarks About the Preferred Embodiment

One of ordinary skill in the arts of strain gages and ceramic materials, and more particularly the art of designing pointing sticks with strain gages on the sides, will realize many advantages from using the preferred embodiment. In particular, pointing stick 10 is capable of now performing selection and dragging of icons on a monitor in addition to double clicking for selection of an item. In this operation, the user would hold down the pointing stick 10 while exerting additional force in the X-Y plane for controlling the direction of the icon being dragged. These functions are now capable of being performed with a single finger while the remaining fingers are inactively located on a homerow of the keyboard. The homerow being the keys marked "a, s, d, f, j, k, l, and;" as typically referred to in typing manuals.

It is noted that a skilled artisan will know that there are many names for the pressure strips 32, 60 and 64. For example, they could be called strain gages, pressure sensitive strips or resistors, piezoelectric strips, or piezoresistive strips.

Variations of the Preferred Embodiments

One of ordinary skill in the art of making pointing stick will realize that there are many different ways of accomplishing the preferred embodiment. For example, although the shaft is illustrated with a spacer 78, it is contemplated to locate the spacer in any location sufficient to create a space between the conductive layer 80 and conductive pads 70 and 72. Specifically, the spacer could be located along the periphery of shaft top 13. Similarly, the spacer could be located on conductive layer 80; of course the spacer would be made of a non-conductive material. Additionally, the spacer may not be in the shape of a bar as illustrated. For example, the spacer could be any projection like a pillar or small button sufficient to separate the conductive elements and allow for temporary contact therebetween upon application of sufficient z-axis forces. It is even contemplated to have no spacer 78. The only requirement is to position the pads 70 and 72 a sufficient distance form conductive layer 80 and to be able to temporarily make contact therebetween during a sufficiently applied z-axis force. Additionally, the spacer could be unattached to either the cap or shaft and just be a separate part placed therebetween.

Although sensor 30 is illustrated to be attached to the shaft, it is contemplated to have the sensor located anywhere that can sense the applied forces on the shaft. For example, the sensors could be mounted on base 14, or even on flexible film 18.

Of course, a skilled artisan knows that the location of the flexible film has many options. For example, the film could be on the top side of the base, it could even ride up the sides of the shaft as taught by U.S. Pat. No. 5,489,900.

The pressure sensitive strips 32, 60 or 64 are mounted on the side and top of shaft 12 can be made of many materials sufficiently sensitive for this application. For example, the material could be made of pressure sensitive material, piezoelectric material, resistor material, or strain gage material.

It is noted that using material 40 to connect shaft 12 to base 14 will not always be needed. Often a tight mechanical fit will be sufficient for proper operation of pointing stick 10.

Although shaft 12 and base 1 are illustrated as two separate parts it is contemplated to have them as one integral part. In this case, strain gages 32 and 66 would have to repositioned to the base, for example. Additionally, flexible cable 18 would also be relocated to the top of base 14, for example.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What we claim and desire to be secured by Letters Patent is:

1. A device for controlling movement of an object that is electrically responsive to the device, comprising:
    a) a shaft having a longitudinal length oriented along a first axis and having a top surface that is generally perpendicular to the first axis;
    b) a flexible cap disposed over the top surface, the cap having a conductive layer attached to the cap between the cap and the top surface;
    c) a base having an end of the shaft fixedly mounted thereon;
    d) a horizontal sensor, mounted on the shaft, for sensing a generally horizontal oriented force that is applied to the shaft in a direction that is oriented generally perpendicular to the first axis; and
    e) a vertical sensor, mounted on the top surface of the shaft, for sensing a generally vertical oriented force that is applied to the shaft generally in a direction that is oriented along the first axis, the vertical sensor including:
        e1) a first and second electrically conductive pads that are electrically isolated from each other such that a sufficient vertical force applied to the cap will cause the conductive layer to deform and contact both the first and second pads to make electrical contact therebetween; and
        e2) an electrically insulative spacer that is shaped to position the first and second pads away from the conductive layer.

2. The device according to claim 1, wherein the spacer has a raised portion positioned between the first and second pads.

3. The device according to claim 1, wherein the horizontal sensor is a pressure sensitive strip, located on at least two sides of the shaft, having a first end that extends to a first point that is above the top surface of the base and a second end that extends to a second point that is located below the top surface of the base.

4. A device for controlling movement of an object that is electrically responsive to the device, comprising:
    a) a shaft having a longitudinal length oriented along a first axis and having side surfaces and a top surface that is generally perpendicular to the first axis;
    b) a flexible cap disposed over the second surface;
    c) a base having an end of the shaft fixedly mounted thereon;
    d) a horizontal sensor, mounted on at least one of the side surfaces, for sensing a generally horizontal oriented force that is applied to the shaft in a direction that is oriented generally perpendicular to the first axis; and
    e) a vertical sensor, mounted on the top surface of the shaft, for sensing a generally vertical oriented force that is applied to the shaft generally in a direction that is oriented along the first axis, the vertical sensor including:
        e1) a pressure sensitive layer located on the top surface of the shaft such that a sufficient vertical force applied to the cap will cause the pressure sensitive layer to deform and cause a change in electrical conductivity of the pressure sensitive layer;
    f) a strain concentrator attached to the cap and located between the cap and the pressure sensitive layer, the strain concentrator shaped and positioned to concentrate the vertical oriented force applied to the cap.

5. The device according to claim 4, wherein the strain concentrator is a rounded cone having an apex positioned on the pressure sensitive layer.

6. The device according to claim 4, wherein the horizontal sensor is a pressure sensitive strip, located on at least two sides of the shaft, having a first end that extends to a first point that is above the top surface of the base and a second end that extends to a second point that is located below the top surface of the base.

7. A joystick, comprising:
   a) an elongated shaft having a plurality of side surfaces and a top surface that is generally perpendicular to the side surfaces;
   b) a flexible cap disposed over the top surface, the cap having a conductive layer attached to the cap between the cap and the top surface;
   c) a base having an end of the shaft fixedly mounted thereon;
   d) a horizontal sensor, mounted on at least one of the side surfaces, for sensing a generally horizontal oriented force that is applied to the shaft; and
   e) a vertical sensor, mounted on the top surface of the shaft, for sensing a generally vertical oriented force that is applied to the shaft, the vertical sensor including:
      e1) a first and second electrically conductive pads that are electrically isolated from each other such that a sufficient vertical force applied to the cap will cause the conductive layer to deform and contact the first and second pads to make electrical contact therebetween; and
      e2) an electrically insulative spacer that is shaped to position the first and second pads away from the conductive layer.

\* \* \* \* \*